(No Model.)

M. W. DEWEY.
ELECTRIC RAILWAY.

No. 439,867. Patented Nov. 4, 1890.

WITNESSES:
J. J. Laass
H. M. Seamans

INVENTOR,
Mark W. Dewey,
BY
Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

ELECTRIC RAILWAY.

SPECIFICATION forming part of Letters Patent No. 439,867, dated November 4, 1890.

Application filed June 30, 1890. Serial No. 357,217. (No model.)

*To all whom it may concern:*

Be it known that I, MARK W. DEWEY, of Syracuse, in the county of Onondaga, in the State of New York, have invented new and useful Improvements in Electric Railways, (Case No. 64,) of which the following, taken in connection with the accompanying drawings, is a full, clear, and exact description.

My invention relates to electric railways; and it consists in certain improvements herein set forth and shown in the accompanying drawings.

My invention consists in certain improvements in the apparatus shown and described in my prior patent for electric railways, No. 419,841, dated January 21, 1890.

The object of my invention is to provide new, improved, and more effectual or powerful means for creating or generating counter electro-motive force in the line-working conductor and between the electric connections leading from the said conductor to the motor on the vehicle or car.

To this end my invention consists in the combination, in an electric railway, of a source of irregular or alternating currents, a line-working conductor extending therefrom, a series of coils distributed apart along the way and connected with the conductor in series, a vehicle, an electric motor to propel said vehicle, electric connections between said motor and working-conductor, and means carried by the vehicle to cause the generation of counter electro-motive force in one or more of the said coils near the vehicle.

My invention consists, further and more specifically, in the combination, in an electric railway, of a source of irregular or alternating currents, a line-working conductor extending therefrom, a slotted conduit containing the conductor, a series of coils distributed apart along the way and connected with the conductor in series, an iron core for each of said coils and having exposed poles extending along the way, a vehicle, an electric motor to propel said vehicle, electric connections between said motor and working-conductor, and an iron body carried by the vehicle and arranged to make contact with said poles to maintain one or more closed magnetic circuits at or near the vehicle during its movement to cause the generation of counter electro-motive force in one or more of the said coils at or near the vehicle and between the connections.

My invention consists, also, in certain other combination of parts, hereinafter described, and set forth in the claims.

Figure 1:
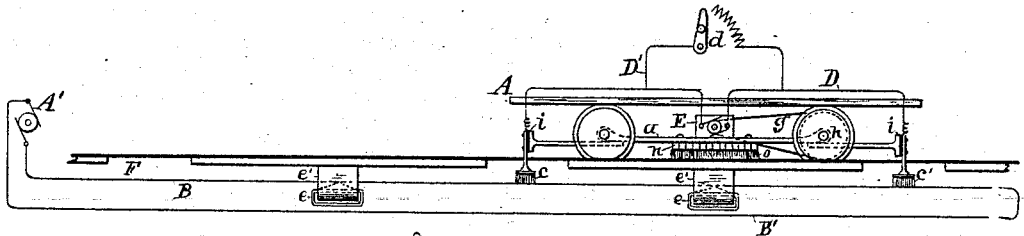
Figure 2:
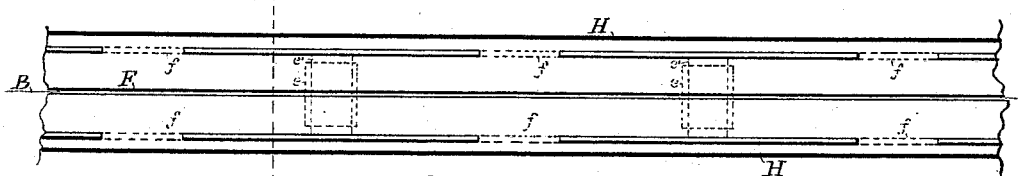
Figure 3:
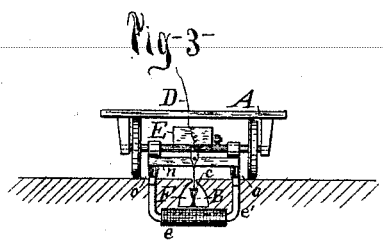
Figure 4:
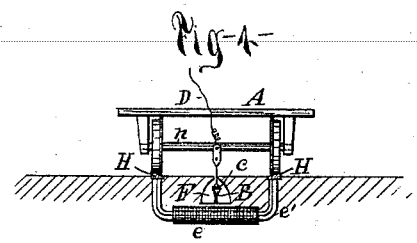
Figure 5:

In the drawings, Figure 1 is a side elevation, partly in section, of an electric railway and motor-car embodying my invention. Fig. 2 is a plan view of the road-bed. Fig. 3 is a cross-section of the railway, slotted conduit, and end elevation of car. Fig. 4 is a modification of Fig. 3, and Fig. 5 is a side elevation of a rail constructed of sections of magnetic and sections of non-magnetic metal.

Referring specifically to the drawings, A in the figures represents the vehicle or car, A' the source of irregular or alternating currents, and B the supply or line-working conductor connected to said source.

c and c' are the electrical connections or movable contacts carried by the vehicle and disposed one in advance of the other or at each end of the car and in contact with the conductor B, and H is the track.

D is the vehicle-conductor containing the propelling-motor and connected to the contacts c and c'.

Referring to Figs. 1, 2, and 3 of the drawings, F represents an ordinary well-drained slotted underground conduit along the railway and containing the line-conductor B, suitably supported therein.

D' is a shunt-circuit around the motor on the vehicle, and contains a current-regulator d in the form of an adjustable resistance for shunting more or less current of the line-conductor B around the motor E to control the same. The motor E is shown connected to the driving-axle h by a belt or chain g; but said motor and driving-axle may of course be connected together in any other suitable manner.

B' indicates an insulated return-conductor. The electrical contacts c and c' are shown as metallic brushes; but wheels or rollers arranged yieldingly may be used instead, if desired. The said contacts are preferably suspended and insulated from the truck-frame $a$ of the vehicle, the insulation being shown at $i$.

In order to generate a counter electro-motive force in the line-conductor between the contacts, I provide coils $e\ e$ and distribute them apart along the railway or path of the vehicle and connect them with the conductor B in series. Said coils are preferably placed in the road-bed between the rails and an equal distance apart.

I do not limit myself to the distance between the coils, but prefer to place them apart about the length of the vehicle or car.

$e'\ e'$ are cores of paramagnetic material, as iron, for said coils, and arranged with their axes in a direction at right angles to the track, but with their poles extended to, beyond, or in proximity to the surface of the road-bed and located on opposite sides of the center thereof. Said poles preferably extend somewhat beyond or above the surface of the road-bed, are bare or exposed, and also extend along the way or track on both sides of the coil. These coils and cores along the railway do not offer much resistance or generate much counter electro-motive force in the line-conductor to the alternating current, although connected in series, for the well-known reason that said cores do not form complete or nearly complete magnetic circuits.

As the counter electro-motive force is only desired to be created in the coils at or near the car and between the contacts $c$ and $c'$, I provide the car with an iron body $n$, preferably in the shape of a laminated plate, as shown in Figs. 1 and 2 of the drawings, to bridge across between the poles of the cores $e'\ e'$, and thus complete and maintain one or more magnetic circuits.

In order to maintain the magnetic circuit or circuits entirely closed, with variations in the road-bed, yielding paramagnetic contacts, as iron-brushes $o\ o$, are fixed to the body $n$ above the poles of the cores $e'\ e'$ to bear upon the same. The poles of the said cores are preferably separated more or less to prevent the lines of force short-circuiting through neighboring cores, and the body $n$ is made long enough to bridge across from one pole to the other on both sides of the road-bed, so that when the car is between two coils there will be some counter electro-motive force generated in both. The contacts $c\ c'$ of the outside ends of the same are a sufficient distance apart to make contact with the line-conductor on opposite sides of two coils $e\ e$.

If it is desired to make continuous rails of the poles of the cores $e'$, they may be joined together by rails $f$, made of diamagnetic metal, as bronze. (Indicated in dotted lines in Fig. 2.) In some cases the ends or poles of the cores $e'$ may be formed of the rails or track H, upon which the wheels of the car run, in which case the wheels and axles may form the body $n$ carried by the car, as shown in Fig. 4. The last-mentioned figure also shows the core $e'$ laminated to increase the effect.

I do not limit myself to the details of construction, as they may be modified in various ways without departing from my invention.

Having described my invention, what I claim, is—

1. In an electric railway, a source of irregular or alternating currents, a line-working conductor extended therefrom, a series of coils distributed apart along the way and connected with the conductor in series, a vehicle, an electric motor to propel said vehicle, electric connections between said motor and working-conductor, and means carried by the vehicle to cause the generation of counter electro-motive force in one or more of the said coils near the vehicle.

2. In an electric railway, a source of irregular or alternating currents, a line-working conductor extending therefrom, a series of coils distributed apart along the way and connected with the conductor in series, a paramagnetic core or body for each of said coils, a vehicle, an electric motor to propel said vehicle, electric connections between said motor and working-conductor, and means carried by the vehicle to cause the generation of counter electro-motive force in one or more of the said coils near the vehicle and between the connections.

3. In an electric railway, a source of irregular or alternating currents, a line-working conductor extending therefrom, a series of coils distributed apart along the way and connected with the conductor in series, a paramagnetic core or body for each of said coils, a vehicle, an electric motor to propel said vehicle, electric connections between said motor and working-conductor, and a paramagnetic body carried by the vehicle to cause the generation of counter electro-motive force in one or more of the said coils near the vehicle and between the connections.

4. In an electric railway, a source of irregular or alternating currents, a line-working conductor extending therefrom, a series of coils distributed apart along the way and connected with the conductor in series, an iron core for each of said coils, pole-pieces for said cores extending along the way, a vehicle, an electric motor to propel said vehicle, electric connections between said motor and working-conductor, and an iron body carried by the vehicle and arranged to cause the generation of counter electro-motive force in one or more of the said coils at or near the vehicle and between the said connections.

5. In an electric railway, a source of irregular or alternating currents, a line-working conductor extending therefrom, a series of coils distributed apart along the way and connected with the conductor in series, an iron core for each of said coils, pole-pieces for said cores extending along the way and beyond or in proximity to the surface of the road-bed, a vehicle, an electric motor to propel said vehicle, electric connections between said motor and working-conductor, and an iron body carried by the vehicle and arranged to cause the generation of counter electro-motive force in one or more of the said coils at or near the vehicle and between the said connections.

6. In an electric railway, a source of irregular or alternating currents, a line-working conductor extending therefrom, a series of coils distributed apart along the way and connected with the conductor in series, an iron core for each of said coils, pole-pieces for said cores extending along the way and on opposite sides of the center of the road-bed, a vehicle, an electric motor to propel said vehicle, electric connections between said motor and working-conductor, and an iron body carried by the vehicle and arranged to cause the generation of counter electro-motive force in one or more of the said coils at or near the vehicle and between the said connections.

7. In an electric railway, a source of irregular or alternating currents, a line-working conductor extending therefrom, a series of coils distributed apart along the way and connected with the conductor in series, an iron core for each of said coils, pole-pieces for said cores extending along the way and on opposite sides of the center of the road-bed, a vehicle, an electric motor to propel said vehicle, electric connections between said motor and working-conductor, and an iron body carried by the vehicle and arranged in suitable inductional relation to said poles to cause the generation of counter electro-motive force in one or more of the said coils at or near the vehicle and between the said connections.

8. In an electric railway, a source of irregular or alternating currents, a line-working conductor extending therefrom, a series of coils distributed apart along the way and connected with the conductor, an iron core for each of said coils and having exposed poles, a vehicle, an electric motor to propel said vehicle, electric connections leading to the motor, and an iron body carried by the vehicle and arranged to make contact with said poles to maintain one or more closed magnetic circuits at or near the vehicle during its movement.

9. In an electric railway, a source of irregular or alternating currents, a line-working conductor extending therefrom, a series of coils distributed apart along the way and connected with the conductor in series, an iron core for each of said coils and having exposed poles extending along the way, a vehicle, an electric motor to propel said vehicle, electric connections between said motor and working-conductor, and an iron body carried by the vehicle and arranged to make contact with said poles to maintain one or more closed magnetic circuits at or near the vehicle during its movement to cause the generation of counter electro-motive force in one or more of the said coils at or near the vehicle and between the connections.

10. In an electric railway, a source of irregular or alternating currents, a line working conductor extending therefrom, a series of coils distributed apart along the way and connected with the conductor in series, a laminated iron core for each of said coils and having exposed poles extending along the way, a vehicle, an electric motor to propel said vehicle, electric connections between said motor and working-conductor, and a laminated iron body carried by the vehicle and arranged to make contact with said poles to maintain one or more closed magnetic circuits at or near the vehicle during its movement to cause the generation of counter electro-motive force in one or more of the said coils at or near the vehicle and between the connections.

11. In an electric railway, a source of irregular or alternating currents, a line-working conductor extending therefrom, a series of coils distributed apart along the way and connected with the conductor in series, an iron core for each of said coils and having exposed poles extending along the way, a vehicle, an electric motor to propel said vehicle, electric connections between said motor and working-conductor, and an iron body carried by the vehicle and arranged to make a yielding or flexible contact with said poles to maintain one or more closed magnetic circuits at or near the vehicle during its movement to cause the generation of counter electro-motive force in one or more of the said coils at or near the vehicle and between the connections.

12. In an electric railway, a source of irregular or alternating currents, a line-working conductor extending therefrom along the railway, a series of coils connected to the conductor and distributed at intervals along the way, cores for the coils having their poles in contact with the rails, a rail along the railway constructed of sections of iron and alternate sections of non-magnetic metal, a vehicle, an electric motor to propel said vehicle, electric connections between said motor and working-conductor, and paramagnetic or iron wheels and axles for the vehicle.

13. In an electric railway, a source of irregular or alternating currents, a line-working conductor extending therefrom along the railway, a series of coils connected to the conductor and distributed at intervals along the way, cores for the coils having their poles in contact with the rails, rails along the railway parallel with each other, each constructed of sections of iron and alternate sections of non-magnetic metal, a car, an electric motor to propel said car, electric connections between said motor and working-conductor, and an iron body moved with the car and making contact with said rails.

14. In an electric railway, a source of irregular or alternating currents, a line-working conductor extending therefrom, a slotted conduit containing the conductor, a series of coils distributed apart along the way and connected with the conductor in series, a vehicle, an electric motor to propel said vehicle, electric connections between said motor and working-conductor, and means carried by the vehicle to cause the generation of counter electro-motive force in one or more of the said coils near the vehicle.

15. In an electric railway, a source of irregular or alternating currents, a line-working conductor extending therefrom, a slotted conduit containing the conductor, a series of coils distributed apart along the way and connected with the conductor in series, an iron core for each of said coils and having exposed poles extending along the way, a vehicle, an electric motor to propel said vehicle, electric connections between said motor and working-conductor, and an iron body carried by the vehicle and arranged to make contact with said poles to maintain one or more closed magnetic circuits at or near the vehicle during its movement to cause the generation of counter electro-motive force in one or more of the said coils at or near the vehicle and between the connections.

In testimony whereof I have hereunto signed my name this 27th day of June, 1890.

MARK W. DEWEY. [L. S.]

Witnesses:
   C. H. DUELL,
   H. M. SEAMANS.